United States Patent [19]

Faure

[11] Patent Number: 4,517,848
[45] Date of Patent: May 21, 1985

[54] APPARATUS FOR MEASURING FORCES

[75] Inventor: Raymond Faure, Veyre Monton, France

[73] Assignee: Compagnie Generale des Etablissements Michelin, Clermont-Ferrand, France

[21] Appl. No.: 476,360

[22] Filed: Mar. 17, 1983

[30] Foreign Application Priority Data

Apr. 1, 1982 [FR] France .................. 82 05847

[51] Int. Cl.³ .................................... G01L 1/26
[52] U.S. Cl. ................... 73/862.52; 73/711; 73/744
[58] Field of Search ............... 73/862.62, 862.63, 745, 73/746, 146.8, 744, 711, 862.52, 1 B; 177/169

[56] References Cited

U.S. PATENT DOCUMENTS

| 1,333,549 | 3/1920 | Keynton | 73/744 X |
| 1,961,368 | 6/1934 | Larson | 73/862.52 |
| 2,384,437 | 9/1945 | Boynton | 73/862.62 X |
| 3,979,960 | 9/1976 | Schwartz | 73/744 |
| 4,375,788 | 3/1983 | Malec | 73/146.8 X |

FOREIGN PATENT DOCUMENTS

| 858136 | 12/1952 | Fed. Rep. of Germany | 73/744 |
| 201552 | 4/1924 | United Kingdom | 177/169 |

Primary Examiner—James L. Rowland
Assistant Examiner—Brian R. Tumm
Attorney, Agent, or Firm—Brumbaugh, Graves, Donohue & Raymond

[57] ABSTRACT

An apparatus for measuring forces comprises a coil spring within a body; a movable part within the body, the movable part being subjected to the action of the force to be measured and being in contact with one end of the coil spring; a needle on a dial which makes it possible to visualize the correlation between the position of the movable part within the body and the value of the force; an adjustment sleeve within the body with an external thread which can be screwed into an internal thread of the body, the adjustment sleeve being in contact with the other end of the coil spring; the adjustment sleeve has an internal thread within which the coil spring can be screwed; and the external and internal threads of the adjustment sleeve have the same pitch.

9 Claims, 3 Drawing Figures

APPARATUS FOR MEASURING FORCES

The present invention concerns an apparatus for measuring forces. The invention concerns, for instance, apparatus which make it possible to measure pressures via forces resulting from such pressures. Such apparatus serve, in particular, for measuring the pressure of the air contained within pneumatic tires. These apparatus generally have springs which rest against pistons where the pressure to be measured is exerted, the springs making it possible to measure the force resulting from the action of the pressure on the pistons. The calibrating of these apparatus is difficult to effect since it is necessary to remove at least one part several times upon this calibration, which thus makes successive groping necessary. The known measuring apparatus therefore lead to calibrations which cause imperfect adjustments, losses in time and therefore high costs of labor.

The object of the present invention is to overcome these drawbacks. Accordingly, the apparatus of the invention for measuring forces is characterized by the following features:

(a) it has a coil spring within a body;

(b) it has a movable part within the body, the movable part being subjected to the action of the force to be measured and being in contact with one end of the coil spring;

(c) it has means which make it possible to visualize the correlation between the position of the movable part within the body and the value of the force;

(d) it has an adjustment sleeve within the body with an external thread which can be screwed into an internal thread of the body, the adjustment sleeve being in contact with the other end of the coil spring;

(e) the adjustment sleeve has an internal thread within which the coil spring can be screwed; and (f) the external and internal threads of the adjustment sleeve have the same pitch.

The invention also concerns an assembly formed by the apparatus of the invention and by means which make it possible to adjust the positions of the adjustment sleeve and of the coil spring within the body, said means being removable. The invention further concerns a method for adjusting the apparatus of the invention.

The example which follows, as well as the schematic figures of the drawing which correspond to this example, are intended to illustrate the invention and to facilitate an understanding thereof, without, however, limiting its scope.

Figure 1:
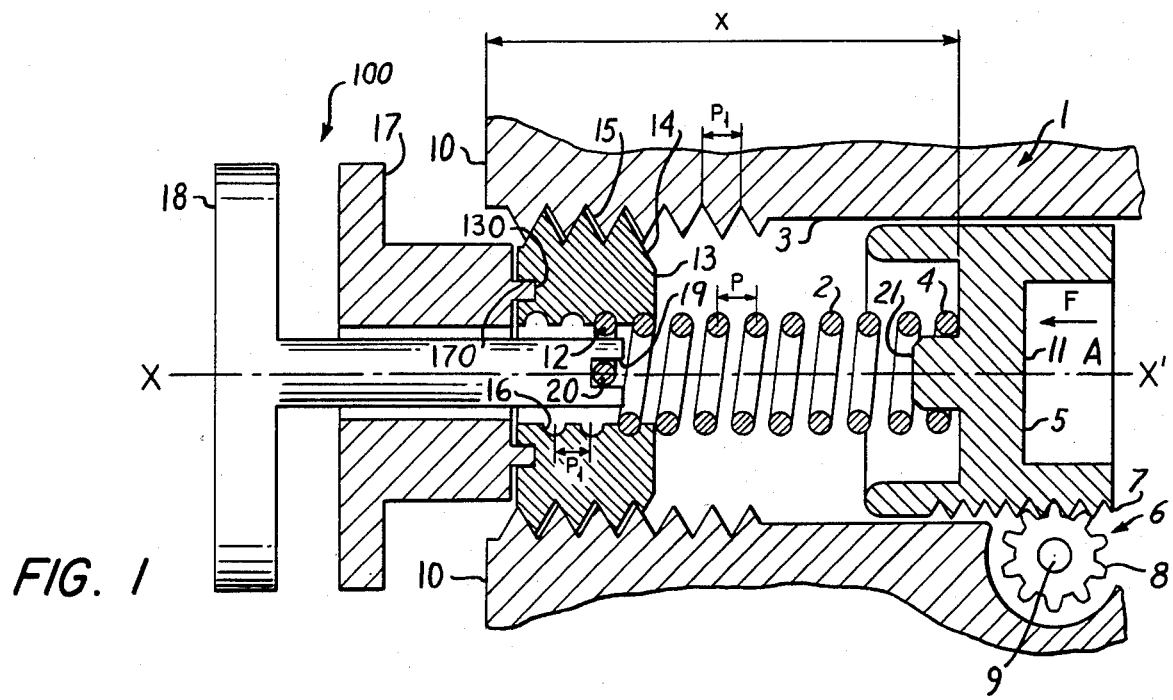
FIG. 1 shows in cross-section a measuring apparatus and an assembly in accordance with the invention, the cross-section being taken along the axis of the coil spring of this apparatus.

FIG. 1 shows a measuring apparatus 1 according to the invention. This apparatus 1 has a coil spring 2 within a body 3. The pitch P of the useful turns of the coil spring 2 varies as a function of the force, being indicated by the arrow F, applied to it, but this pitch P is constant for a given force. XX' represents the axis of the coil spring 2. The end 4 of coil spring 2 is in contact with a part 5 which is movable within the body 3 and subjected to the action of the force F. This movable part 5 is, e.g., a piston which moves in the body 3 under the action of the force F. The apparatus 1 has known means 6 which make it possible to visualize the correlation between the position of the piston 5 within the body 3 and the value of the force F.

The means 6 comprises, for instance, a rack 7 which turns a pinion 8 around a fixed shaft 9. The rotation of the pinion 8 makes it possible to cause a pointer to pivot over a dial as a function of the position of the piston 5 within the body 3, that is to say as a function of the distance x between the piston 5 and a fixed point on the body 3, for instance, its end 10. For purposes of simplification, the needle and the dial have not been shown in the drawing. The position of the piston 5 within the body 3, that is to say the distance x, varies as a function of the force F, that is to say the position of the needle on the dial varies as a function of the force F.

The force F is obtained, for instance, by the action of the pressure of a fluid A, in particular a gas, on the face 11 of the piston 5 opposite the coil spring 2. In this case, the above-mentioned means 6 make it possible to visualize the correlation between the position of the piston 5 and the pressure of the fluid A, the dial—if it is used—being then graduated in pressure units, for instance, in bars.

Figure 2:
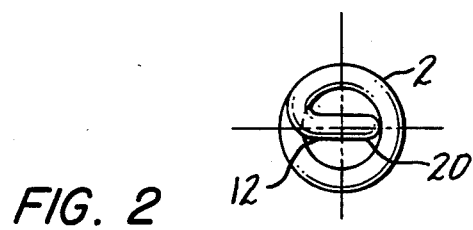
FIG. 2 shows in front view one end of the coil spring of the apparatus shown in FIG. 1.

The other end 12 of the coil spring 2 is in contact with an adjustment sleeve 13 which has an external thread 14 which can screw into an internal thread 15 of the body 3. The adjustment sleeve 13 has an internal thread 16 into which the coil spring 2 can be screwed. The threads 14, 15, 16 have the same pitch $P_1$, this pitch $P_1$ being equal to the pitch P of the spring 2 when it is deformed under the action of a given force $F_1$. The useful turns of the coil spring 2 are located between the adjustment sleeve 13 and the piston 5. The adjustment sleeve 13 can be threaded into the body 3 due to a removable key 17 which is brought into contact with the adjustment sleeve 13 at the time of the adjustment. In order to drive the adjustment sleeve 13 in rotation, the removable key 17 has, for instance, tenons 170 which penetrate into corresponding recesses 130 in the adjustment sleeve 13. In order for the coil spring 2 to screw or unscrew in the internal thread 16 of the adjustment sleeve 13 it is sufficient to use means which make it possible to lock the coil spring 2 while the adjustment sleeve 13 is screwed or unscrewed in the body 3. These means are developed, for instance, as a removable key 18 which can be shifted axially within the key 17 which then has the shape of a hollow cylinder. This key 18 has, for instance, a groove 19 into which a portion 20 of the end 12 of the coil spring 2 can enter, the portion 20 being obtained, for example, by bending the end of the wire forming the coil spring 2, this bend being effected towards the inside of the coil spring, as shown in FIG. 2.

The recesses 130 constitute means which make it possible to adjust the position of the adjustment sleeve 13 within the body 3 and the bent end portion 20 of the coil spring 2 constitutes means for locking the coil spring 2. These means 130, 20, which form part of the apparatus 1, can be actuated directly from the outside of the apparatus 1 without taking the apparatus 1 apart, that is to say they are accessible directly from the outside. The removable keys 17, 18 constitute means for adjusting the positions of the adjustment sleeve 13 and of the coil spring 2 within the body 3, the combination of the apparatus 1 and the means 17, 18 constituting an assembly 100. It goes without saying that at least one of these means 17, 18 could possibly be permanently integrated in the apparatus 1.

Figure 3:
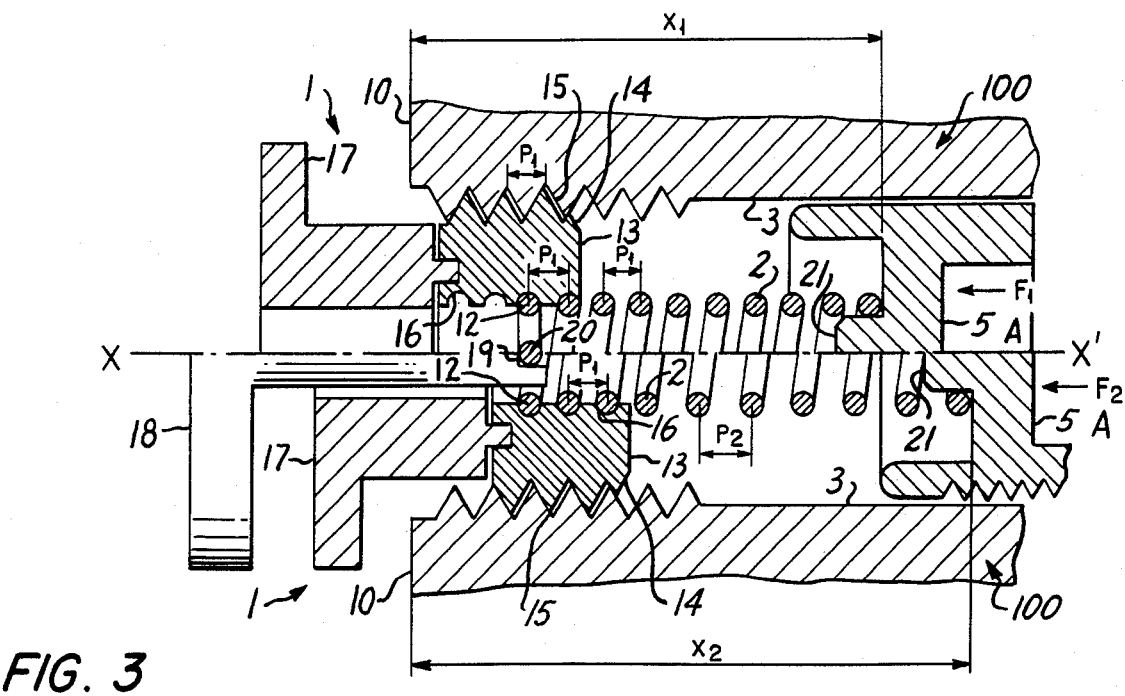
FIG. 3 shows in cross-section two positions of the apparatus and assembly which have been shown in FIG. 1, during two adjustment operations, these two positions being separated by the axis of the coil spring of this apparatus, the cross-section being taken along said axis.

The adjustment of the apparatus 1 is effected in the following manner. The end 12 of the coil spring 2 is screwed into the adjustment sleeve 13 by means of the thread 16; the adjustment sleeve 13 is then screwed into the body 3 by means of the threads 14, 15, the useful turns of the coil spring 2 being on the same side as the piston 5. The calibrated predetermined force $F_1$ is then applied on the coil spring 2 via the piston 5, the useful turns of the coil spring 2 having thus the pitch $P_1$ identical to the pitch of the threads 14, 15, 16. The distance $x_1$ of the piston 5 from the end 10 is then adjusted by screwing or unscrewing the adjustment sleeve 13 in the body 3 without locking the coil spring 2 by means of the key 18, the force $F_1$ being always applied on the coil spring 2. The distance $x_1$ is determined in such a manner that the pointer on the dial coincides with the graduation corresponding to the force $F_1$. A second calibrated force $F_2$ is then applied to the coil spring 2. The coil spring 2 is then locked by the key 18 and the distance $x_2$ between the piston 5 and the end 10 is adjusted by screwing or unscrewing the adjustment sleeve 13 in the body 3, the force $F_2$ being always applied to the coil spring 2. The distance $x_2$ is determined in such a manner that the pointer on the dial coincides with the graduation corresponding to the force $F_2$. Since the coil spring 2 is locked upon this second adjustment operation, the number of useful turns of the coil spring 2 which is screwed or unscrewed in the thread 16 during the second operation is changed, these useful turns then having a pitch $P_2$ different from $P_1$. Due to the selection of the pitch $P_1$, the distance $x_1$ corresponding to the force $F_1$ remains unchanged despite this second adjustment operation. The position of the apparatus 1 and of the assembly 100 at the end of each of the two said adjustment operations is represented in FIG. 3. Since the relation between the force F and the distance x is linear within the range of forces F under consideration, calibration with the two forces $F_1$, $F_2$ assures correct measurement for this entire range of forces. The calibrating of the apparatus 1 is effected in very simple manner, without intermediate disassembly and without groping and hence with reduced cost for labor. The centering of the coil spring 2 during these adjustments and during the operation of the apparatus 1 is obtained, for instance, by means of a cylindrical part 21 arranged within the coil spring 2 (FIG. 1).

When the calibrating of the apparatus has been completed, known means can be used, if desired, to prevent the apparatus from losing its adjustment during use, said means making it possible, for instance, to lock the adjustment sleeve so as to prevent movements thereof within the body.

Of course, the invention is not limited to the embodiment which has been described above.

What is claimed is:

1. An apparatus for measuring forces, characterized by the following features:
   (a) a coil spring within a body;
   (b) a movable part within the body, the movable part being subjected to the action of a force to be measured and being in contact with one end of the coil spring;
   (c) means to visualize the correlation between the position of the movable part within the body and the value of the force;
   (d) an adjustment sleeve within the body with an external thread which can be screwed into an internal thread of the body, the adjustment sleeve being in contact with the other end of the coil spring;
   (e) the adjustment sleeve has an internal thread within which the coil spring can be screwed;
   (f) the external and internal threads of the adjustment sleeve have the same pitch;
   (g) first means adapted to receive removable means to selectively prevent the coil spring from rotating within the body;
   (h) second means adapted to receive removable means to selectively adjust the position of the adjustment sleeve within the body; and
   (i) said first and second means may each be actuated directly from outside of the apparatus by said removable means without taking the apparatus apart.

2. An apparatus according to claim 1, characterized by the fact that the movable part which is subjected to the action of the force to be measured is a piston.

3. An apparatus according to claim 1, characterized by means which make it possible to center the coil spring within the body.

4. An apparatus according to claim 1, characterized by the fact that said first means comprises a bent end of the coil spring.

5. An apparatus according to claim 1, characterized by the fact that the pitch of the external and internal threads of the adjustment sleeve is equal to the pitch of the coil spring when subjected to the action of a given force used for calibration.

6. An apparatus according to claim 1, which permits measurement of the pressure of a fluid via the force due to said pressure.

7. An apparatus according to claim 1, characterized by the fact that said second means comprises recesses in the adjustment sleeve.

8. An assembly comprising an apparatus having the following features:
   (a) a coil spring within a body;
   (b) a movable part within the body, the movable part being subjected to the action of a force to be measured and being in contact with one end of the coil spring;
   (c) means to visualize the correlation between the position of the movable part within the body and the value of the force;
   (d) an adjustment sleeve within the body with an external thread which can be screwed into an internal thread of the body, the adjustment sleeve being in contact with the other end of the coil spring;
   (e) the adjustment sleeve has an internal thread within which the coil spring can be screwed;
   (f) the external and internal threads of the adjustment sleeve have the same pitch;
   (g) first means adapted to receive removable means to selectively prevent the coil spring from rotating within the body;
   (h) second means adapted to receive removable means to selectively adjust the position of the adjustment sleeve within the body;
   (i) said first and second means may each be actuated directly from outside of the apparatus by said removable means without taking the apparatus apart; and (j) said removable means comprising a second removable key to coact with the second means for selectively driving the adjustment sleeve in rotation and a first removable key to coact with the first means for selectively preventing the coil spring from rotating within the body.

9. An assembly according to claim 8, characterized by the fact that said first removable key slides within said second removable key, said second removable key having the shape of a hollow cylinder.

* * * * *